Aug. 11, 1970     A. N. DE VAULT     3,523,897
INCREASED BASE NUMBER METAL PETROLEUM SULFONATE AND PROCESS
FOR ITS PREPARATION
Filed April 5, 1966
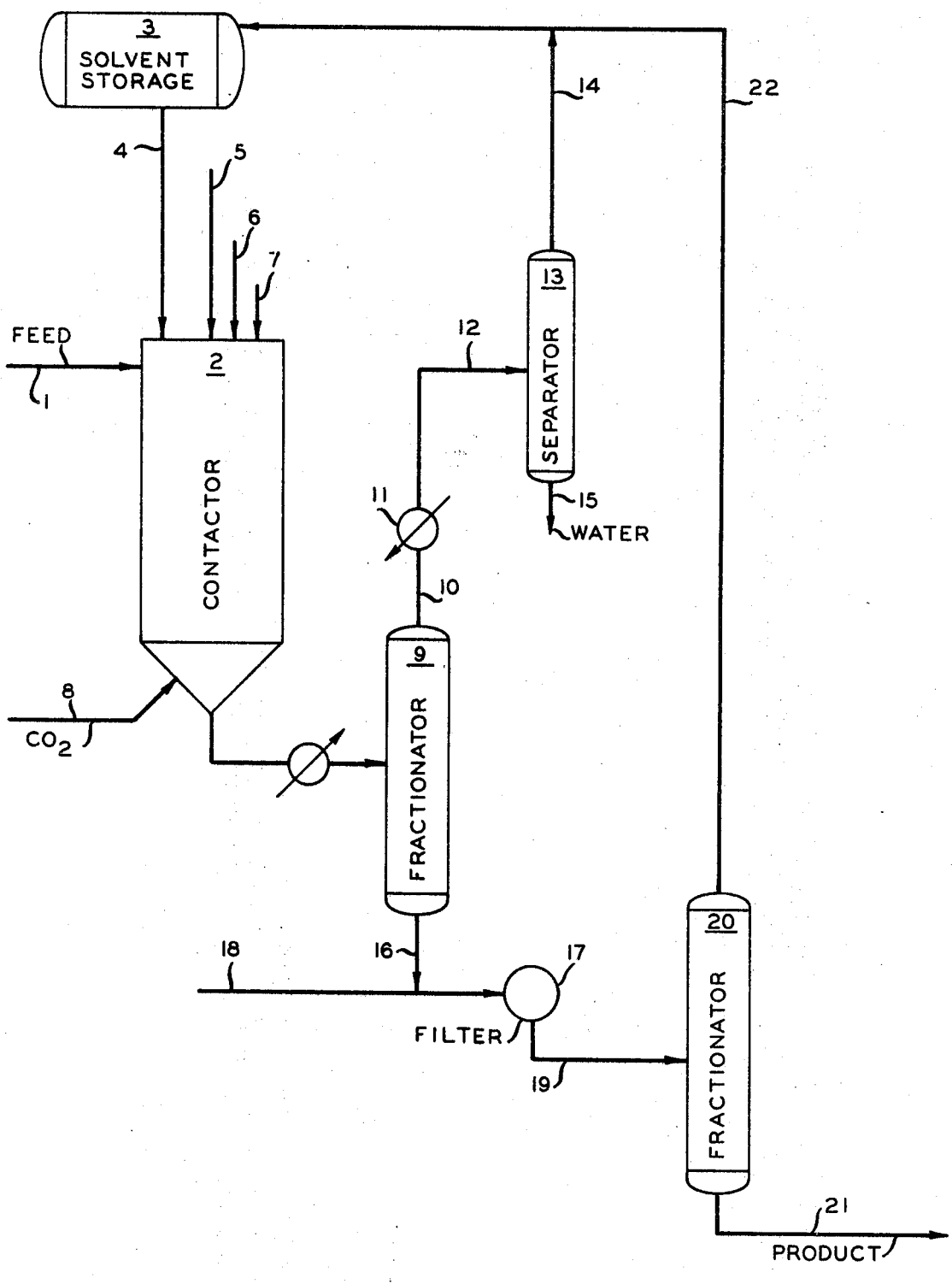
INVENTOR
A. N. DeVAULT
BY
*Young & Quigg*
ATTORNEYS

United States Patent Office 3,523,897
Patented Aug. 11, 1970

3,523,897
INCREASED BASE NUMBER METAL PETROLEUM SULFONATE AND PROCESS FOR ITS PREPARATION
Albert N. De Vault, Bartlesville, Okla., assignor to Phillips Petroleum Company, a corporation of Delaware
Filed Apr. 5, 1966, Ser. No. 540,230
Int. Cl. C10m 1/10, 1/40, 1/48
U.S. Cl. 252—32.7    9 Claims

ABSTRACT OF THE DISCLOSURE

Overbased metal sulfonates are formed by reacting a sulfonic acid or metal salt thereof with metal base and carbon dioxide in the presence of zinc dihydrocaryldithiophosphate at a temperature below 250° F. The inventive sulfonates are used as detergents in lubricating oils.

---

In copending application Ser. No. 540,022, filed Apr. 4, 1966, by Albert N. De Vault there is described and claimed an overbasing process producing a very high base number product employing phenol as a treating agent or catalyst. By the process of the invention, the separation and recycle of the phenol catalyst is completely eliminated.

This invention relates to a novel overbased metal petroleum sulfonate, e.g., overbased calcium petroleum sulfonate.

In one of its aspects, the invention relates to an overbased metal, e.g., calcium, petroleum sulfonate which is prepared by treating a petroleum sulfonic acid and/or a calcium petroleum sulfonate with lime and carbon dioxide in the presence of a zinc dihydrocarbonyldithiophosphate to increase the base number thereof.

The product of the invention finds an important use in adding detergency to lubricating oils.

Thus, metal petroleum sulfonates are being increasingly used in the manufacture of additives for lube oils, especially as these are used in internal combustion engines, to impart detergency to the oils for keeping the engine parts clean and to reduce sludge formation. As is known, the detergency is destroyed as acid formed during combustion of fuels react with the basic petroleum sulfonates. As this occurs, the acids are increasingly free to attack the engine parts. The effective life span of the lube oil additives is increased by the overbasing process which, in effect, increases the alkaline reserve of the oil composition ultimately used.

Alkaline reserve or TBN is defined as the number of milligrams of potassium hydroxide equivalent to the acid required to neutralize the alkalinity in one gram of sample to a pH of four.

A metal petroleum sulfonate having a TBN higher than obtained by simple neutralization of sulfonic acid is said to be "overbased."

I have found that neutralization and/or overbasing can be effected advantageously by treating the petroleum sulfonic acids or the calcium petroleum sulfonates or a mixture of these materials with lime and carbon dioxide in the presence of a zinc dihydrocarbonyldithiophosphate.

Further, I have found that, when a zinc dihydrocarbonyldithiophosphate is used, no separation of the zinc dihydrocarbonyldithiophosphate or any reaction or decomposition product thereof need be effected. Indeed, about the same amount or more of the zinc dihydrocarbonyldithiophosphate is frequently added to the finished lubricating oil as an antioxidant as is used in this invention to effect the overbasing.

It is an object of this invention to provide an increased base number metal petroleum sulfonate. It is another object of this invention to provide a process for preparing an improved increased base number metal petroleum sulfonate. It is a further object of this invention to so prepare a metal petroleum sulfonate suitable for use as an additive to lubricating oil for improving its detergency that the agent required in the overbasing step or operation performs a useful function in the finished oil. It is a further object of the invention to provide a process for the production of an overbased metal petroleum sulfonate suitable for use as a detergency providing additive for lubricating oils in which process an agent used in the overbasing step is such that no recovery of it or any reaction product formed by it is necessary.

Other aspects, objects and the several advantages of this invention are apparent from this description, the drawing and the appended claims.

According to the present invention, there is provided a novel metal petroleum sulfonate having an increased base number by a process which comprises treating at least one of a petroleum sulfonic acid or a calcium petroleum sulfonate with lime and carbon dioxide in the presence of a zinc dihydrocarbonyldithiophosphate.

The zinc dihydrocarbonyldithiophosphates which can be used can be represented by the formula:

$$\begin{array}{c} RO \diagdown \diagup S \quad S \diagdown \diagup OR \\ P \quad \quad P \\ \diagup \diagdown \quad \diagup \diagdown \\ R'O \quad S{-}Zn{-}S \quad OR' \end{array}$$

in which R and R' are at least one of alkyl, aryl, or cycloalkyl radicals having 3 to 20 carbon atoms—e.g., zinc di(4-methylpentyl-2)dithiophosphate. These compounds are well known in the industry as antioxidants for lubricating oils, and are described in a number of U.S. patents, such as U.S. 2,723,235. Specific compounds useful in the process of this invention are:

zinc dipropyldithiophosphate
zinc diisobutyldithiophosphate
zinc dicyclohexyldithiophosphate
zinc diphenyldithiophosphate
zinc dibenzyldithiophosphate
zinc di(2-naphthyl)dithiophosphate
zinc dieicosyldithiophosphate
zinc di(9-anthryl)dithiophosphate
zinc di(8,9-dipropyl-3-phenanthryl)dithiophosphate
zinc di(3-undecylcyclopentyl)dithiophosphate
zinc di(5-cyclohexyloctyl)dithiophosphate
zinc di(3-phenylcyclohexyl)dithiophosphate
zinc di(2-cyclohexylphenyl)dithiophosphate
zinc di(2-methylcyclopentylbenzyl)dithiophosphate,
and the like.

The process of the invention can be applied to either the petroleum sulfonic acids, as are extant in the art, or to finished calcium petroleum sulfonates, for example those of U.S. Pat. 3,135,693 issued June 2, 1964. The neutralization and overbasing can be made to take place in a single contactor or, as desired, separate contactors can be employed for the two reactions. Further, a tray column or other contactor can be employed for introducing all or at least a part of the carbon dioxide, as will be evident to one skilled in the art having possession of this disclosure and having studied the same.

In a now preferred embodiment of the invention, there is employed a petroleum solvent which can be a petroleum naphtha, Stoddard solvent, kerosene, heptane, toluene, benzene, cyclohexane, and the like.

To minimize decomposition of the dithiophosphate during overbasing and especially during subsequent handling operations I prefer to use solvents boiling below about 250° F., and usually in the range 175–250° F., and preferably 200–250° F. if a nonaromatic solvent is used. Use of a lower-boiling solvent permits the use of lower temperatures in solvent recovery operations.

The unneutralized petroleum sulfonic acids and/or the calcium petroleum sulfonates are contacted in the presence of such a solvent, water, lime and any other material which may be desirable in a contactor with the selected zinc dihydrocarbonyldithiophosphate, according to the invention. Carbon dioxide can be fed into this contactor from which the reaction product is then passed to a fractionator for recovery of solvent, the overbased product then being filtered and recovered as more fully described below. The neutralized and overbased product, still admixed with solvent, is heated to recover at least part of the solvent and the water. If desired, additional solvent can be added prior to a filtering step, following which this solvent and any solvent resulting from the initial contacting step are recovered for reuse as may be desired.

The approximate ranges in weight ratio of the materials charged to the contactor to the petroleum sulfonic acid or calcium petroleum sulfonate are:

|  | Parts by weight per 100 parts of— | |
|---|---|---|
|  | Sulfonic acid | Sulfonate |
| Ca(OH)$_2$ | 25–100 | 5–25 |
| H$_2$O | 2–10 | 2–10 |
| Solvent | 200–500 | 200–500 |
| Zinc dihydrocarbonyldithiophosphate | 5–10 | 5–10 |

Preferably sufficient carbon dioxide is charged to the contactor so that an excess is bubbling through the stirred mixture at all times. Contacting is usually carried out at atmospheric pressure and at temperatures in the range of 50–200° F., the upper temperature limit being at least 10–20° F. below the boiling point of the solvent used. Contact times of 1 minute to 1 hour are usually used. The foregoing table illustrates the ranges which are now considered useful and are now preferred. However, it will be evident to those skilled in this art that concentrations outside the given ranges can be used.

It is apparent that the product or composition of the invention contains the zinc dihydrocarbonyldithiophosphate which has been used. Thus, this material, which is an antioxidant, is present in the product and useful therein.

EXAMPLE I

Tests were made in which the contactor charge (parts by weight) was:

| Test No. | 1 | 2 | 3 | 4 |
|---|---|---|---|---|
| Petroleum sulfonic acid [1] | 100 | 100 | | |
| Calcium petroleum sulfonate [2] | | | 100 | 100 |
| Ca(OH)$_2$ | 50 | 50 | 15 | 15 |
| H$_2$O | 6 | 6 | 6 | 6 |
| Stoddard solvent [3] | 300 | 300 | | |
| Toluene | | | 350 | |
| n-Heptane | | | | 275 |
| Dithiophosphate [4] | 10 | 10 | 10 | 10 |

[1] Stream 19, U.S. 3,135,693.
[2] Product of U.S. 3,135,693.
[3] A petroleum distillate having a 50% point of ≤350° F. and an end point of ≤410° F.
[4] Zinc di-(4-methylpentyl-2)dithiophosphate.

Operating conditions and TBN values obtained were:

| Time, minutes | 7.5 | 22.5 | ~5 | 5.0 |
|---|---|---|---|---|
| Temperature, ° F., avg | 154 | 164 | 174 | 172 |
| TBN | 105 | 204 | 143 | 137 |

These tests were all made at atmospheric pressure with carbon dioxide bubbling through the stirred mixture. Carbon dioxide usage in Test 2 was about three times that in the other three tests. In Tests 1 and 2 the water and most of the solvent were removed by heating the mixture to 410° F. Six hundred parts by weight of Stoddard solvent were added, and the solution was filtered to remove solids. The filtrate was freed of solvent by stripping with nitrogen at 410° F. In Test 3 the water and most of the solvent were removed by stripping with nitrogen at 210° F. Seven hundred parts by weight of toluene were added, and the solution was filtered to remove solids. The filtrate was freed of solvent by stripping with nitrogen at 300° F. In Test 4, the water and most of the solvent were removed by stripping with nitrogen at 170° F. Five hundred fifty parts by weight of n-heptane were added, and the solution was filtered to remove solids. The filtrate was freed of solvent by stripping with nitrogen at 290° F.

The advantage of using a low-boiling solvent is shown by the following comparison of the Zn/P weight ratios in the zinc di(4-methylpentyl-2)dithiophosphate and in the products of the tests:

|  | Zn/P weight ratio |
|---|---|
| Zinc di(4-methylpentyl-2)dithiophosphate | 1 |
| Product of Test No. 1 | 0.5 |
| Product of Test No. 3 | 0.93 |
| Product of Test No. 4 | 0.88 |

These ratios show that use of the lower-boiling solvents resulted in less loss of zinc in the products of Tests 3 and 4 compared with the product of Test 1.

EXAMPLE II

Tests are made under the same conditions as Tests 2 and 3 of Example I except that no dithiophosphate is used. The TBN values obtained are both about 10.

The particular petroleum sulfonic acid and/or calcium petroleum sulfonate used as an ingredient in this invention, as it has been described, is not limiting thereof. Other equivalent ingredient or ingredients can be used.

Referring now to the drawing, unneutralized petroleum sulfonic acid or calcium petroleum sulfonate is passed by conduit 1 into contactor 2 in which it is contacted with solvent passed from solvent storage 3 by way of conduit 4, zinc dihydrocarbonyldithiophosphate entering by conduit 5, water by conduit 6, and lime by conduit 7, and, upon agitation, treated with carbon dioxide sparged in near the bottom of the contactor by way of conduit 8. The reacted mass is heated and passed to fractionator 9 in which at least a part of the solvent and water are flashed overhead by way of conduit 10. The water and solvent are passed by way of cooler 11, conduit 12 into separator 13 overhead from which passes by conduit 14 to solvent storage 3. Bottoms from separator 13 are water and are removed at 15. Bottoms from fractionator 9 containing overbase product are passed by conduit 16 into filter 17. If desired, additional suitable solvent can be added at 18. The filter separates undesired solids and the overbased product containing solvent is passed by conduit 19 to fractionator 20, from the base of which overbased product is removed at 21. Solvent flashed overhead by conduit 22 is returned to solvent storage 3.

While the invention has been described with reference to lime or calcium hydroxide, equivalent basic materials are within the scope of the invention and appended claims to the extent one skilled in the art upon mere routine test will find these operative. For example, other alkaline earth metal hydroxides or bases can be used.

Reasonable variation and modification are possible within the scope of the foregoing disclosure, the drawing and the appended claims to the invention, the essence of which is that, in the overbasing of a petroleum sulfonic acid and/or a calcium petroleum sulfonate, there is employed as agent a zinc dihydrocarbonyldithiophosphate with the concomitant advantage that the material resulting from such use can advantageously be used, there remaining in the ultimate product the zinc dihydrocarbonyldithiophosphate which is useful as an antioxidant in the final lubricating oil product, thereby eliminating costly separation and recycle of agent.

I claim:

1. A process for the preparation of an overbased metal petroleum sulfonate by treating at least one of a petroleum sulfonic acid and a calcium petroleum sulfonate with an alkaline earth hydroxide and carbon dioxide which comprises performing the treatment in the presence of a zinc dihydrocarbonyldithiophosphate at a temperature below about 250° F.

2. A process according to claim 1 hereof wherein the zinc dihydrocarbonyldithiophosphate is present in an amount in the approximate range 5-10 percent.

3. A process according to claim 1 hereof wherein lime and carbon dioxide are used.

4. A process according to claim 3 wherein the zinc dihydrocarbonyldithiophosphate can be represented by the formula

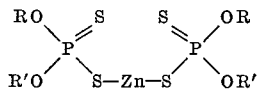

in which R and R' are at least one of alkyl, aryl, or cycloalkyl radicals having 3 to 20 carbon atoms.

5. A process according to claim 4 wherein the process is effected by bringing together the reactants and the zinc dihydrocarbonyldithiophosphate in the presence of water and a petroleum solvent.

6. A process according to claim 5 wherein the zinc dihydrocarbonyldithiophosphate is at least one of the group as follows:

zinc di(4-methylpentyl-2)dithiophosphate
zinc dipropyldithiophosphate
zinc diisobutyldithiophosphate
zinc dicyclohexyldithiophosphate
zinc diphenyldithiophosphate
zinc dibenzyldithiophosphate
zinc di(2-naphthyl)dithiophosphate
zinc dieicosyldithiophosphate
zinc di(9-anthryl)dithiophosphate
zinc di(8,9-dipropyl-3-phenanthryl)dithiophosphate
zinc di(3-undecylcyclopentyl)dithiophosphate
zinc di(5-cyclohexyloctyl)dithiophosphate
zinc di(3-phenylcyclohexyl)dithiophosphate
zinc di(2-cyclohexylphenyl)dithiophosphate
zinc di(2-methylcyclopentylbenzyl)dithiophosphate.

7. A process according to claim 1 wherein the preparation is accomplished employing a solvent boiling below about 250° F., thus permitting a lower solvent recovery operation temperature.

8. A process according to claim 5 wherein the petroleum solvent is a solvent boiling below about 250° F.

9. A process according to claim 1 wherein the zinc dihydrocarbonyldithiophosphate is retained beneficially in the final product and wherein the treatment is effected at a temperature in the approximate range of 50-200° F.

References Cited

UNITED STATES PATENTS

| | | | |
|---|---|---|---|
| 3,135,693 | 6/1964 | Whitney et al. | 260—504 X |
| 2,839,470 | 6/1958 | Warren et al. | 260—504 X |
| 2,695,910 | 11/1954 | Asseff et al. | 260—504 X |

DANIEL E. WYMAN, Primary Examiner

I. VAUGHN, Assistant Examiner

U.S. Cl. X.R.

252—33